June 3, 1969  H. D. LEWIS  3,448,340
TRANSFORMER

Filed June 29, 1965  Sheet 1 of 3

INVENTOR
HERBERT D. LEWIS
BY William R. O'Meara

INVENTOR
HERBERT D. LEWIS
BY William R. O'Meara

June 3, 1969     H. D. LEWIS     3,448,340
TRANSFORMER

Filed June 29, 1965     Sheet 3 of 3

INVENTOR
HERBERT D. LEWIS
BY William R. O'Meara

United States Patent Office 3,448,340
Patented June 3, 1969

3,448,340
TRANSFORMER
Herbert D. Lewis, Florissant, Mo., assignor, by mesne assignments, to Wagner Electric Corporation, South Bend, Ind., a corporation of Delaware
Filed June 29, 1965, Ser. No. 468,001
Int. Cl. H02h 7/14
U.S. Cl. 317—14
16 Claims

ABSTRACT OF THE DISCLOSURE

A transformer having a primary winding, a pair of secondary winding coils disposed concentrically with the primary winding on the radially inner side thereof, and a pair of secondary coils disposed on the radially outer side of the primary winding and having a predeterminately lower resistance per unit length of turn than that of the pair of secondary coils on the radially inner side of the primary winding so that the impedance of the secondary coils are close enough to permit effective parallel operation thereof, protective circuit breakers having circuit interrupting switches and condition responsive means for actuating the switches, each condition responsive means being connected to carry the current of only one secondary coil.

---

Figure 1:
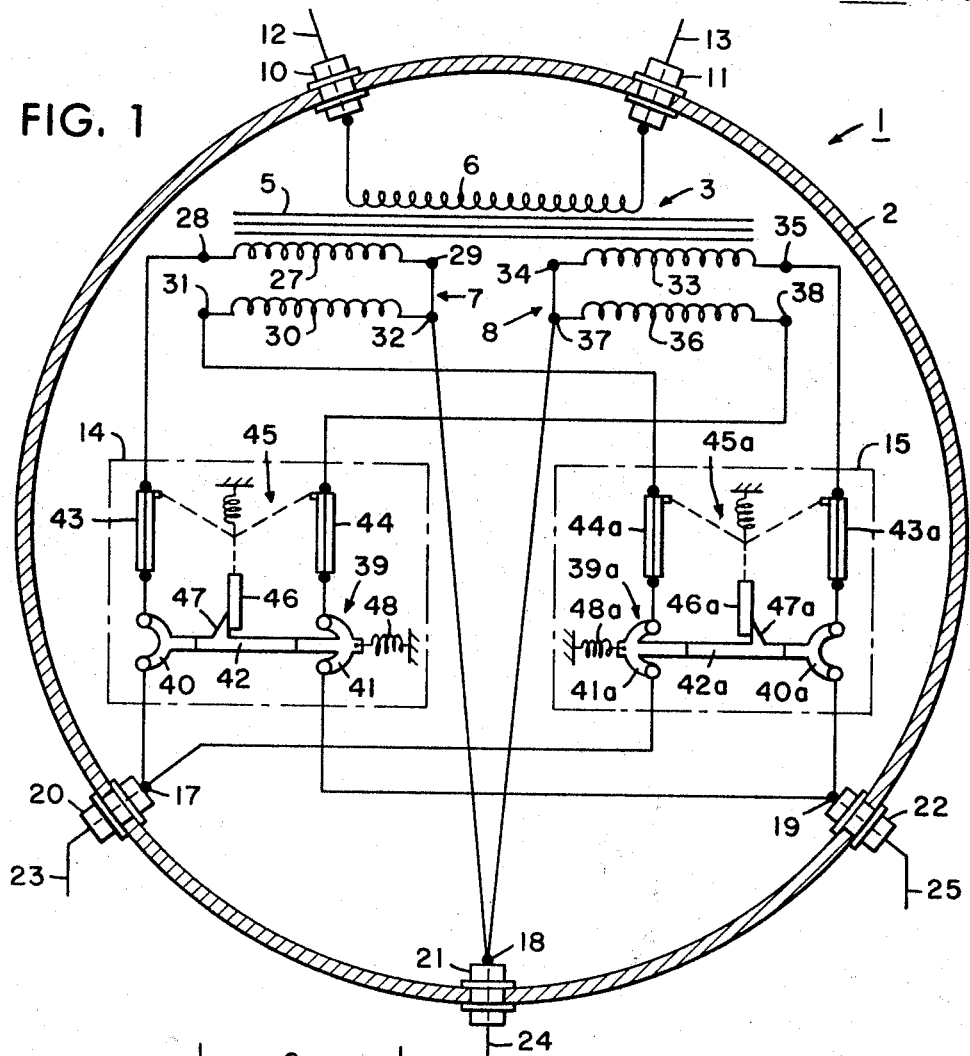

This invention relates to electrical inductive apparatus and more particularly to electrical inductive apparatus having windings adapted for interconnection in either series or parallel relationship.

Distribution transformers, for example, are generally provided with a pair of secondary windings with one end of each connected to one low voltage bushing terminal and the other ends connected respectively to two other low voltage bushing terminals. In this way, the two secondary windings are connected in series between two of the bushing terminals such that the three bushing terminals can be connected to supply power to a three-wire, multiple-voltage load circuit such as a 120/240 volt circuit. While it would be ideal to have the impedance of the two secondary windings equal, the impedance of one secondary winding can be considerably different from that of the other, within limits, without seriously affecting the performance of the transformer when the secondary windings are connected in series with each other for three-wire electric service. However, so that the two secondary windings of the transformer can be connected in parallel with each other when desired and thus supply electric power to a single-voltage load circuit at double the current rating of one winding alone, the impedances of the two secondary windings must not differ too greatly from one another in order to prevent one secondary winding from carrying a much greater portion of the total load current.

In the past, in order to obtain secondary windings having approximately equal impedances, the two secondary windings usually included four secondary coils each concentrically arranged with the primary winding on the transformer core. Two of the coils were disposed on the radially inner side of the primary and the other two coils on the radially outer side of the primary. With this arrangement, the resistances and leakage reactances of the four coils differed because of the differences, for example, in the lengths of the mean turns of the coils; thus, the impedances of the four coils differed. The coils were interconnected, however, such that each secondary winding included one of the relatively low impedance coils and one of the relatively high impedance coils connected in series relationship so that the effective impedances of the two windings were close enough in value for effective parallel operation thereof.

Transformers of the above construction are often provided with protective circuit interrupting means for disconnecting the transformer from the distribution circuit upon predetermined load conditions. In the case of transformers disposed within a tank in a dielectric, the circuit interrupting means usually included circuit breakers connected with the secondary windings and disposed in the dielectric, and condition responsive elements, such as bimetal elements for actuating the breakers. The condition responsive elements were connected respectively in series with the secondary windings, and each was responsive to the total current of the associated secondary winding and the temperature of the dielectric. The circuit breakers therefore had to have a current interrupting capacity corresponding to the full secondary winding current. Since each circuit breaker had to carry full secondary winding current, it was necessarily relatively large and expensive.

In order to use a circuit breaker of smaller size and rating and of lower cost, transformers were often made with four separately connectable coils for each secondary winding instead of two as in the above-mentioned transformer. In this case, each secondary winding included a pair of winding sections connected in parallel, and with each section including a relatively high impedance coil in series with a relatively low impedance coil. In this way, the bimetal element could be connected in series with only one of the winding sections and therefore carry only a portion or half of the total current of the secondary winding instead of the total secondary winding current. Also, it was sometimes desirable to utilize circuit interrupting means having two switches for each secondary winding with each switch connected to interrupt only the current of one winding section, because in some cases it is more economical to use two switches of lower kva. rating than one of higher rating. However, such transformers had the disadvantages of requiring a total of eight separately connectable coils and a total of sixteen coil end terminals, and, thus, the labor time and cost thereof was relatively high. This was especially true in the case of foil-wound transformers; that is, one having coils formed from concentrically wound metal foils or sheets having a width equal to the axial height of the coils. For example, each coil end terminal is relatively expensive since it must extend substantially across the width of the foil in order to obtain a more uniform coil configuration and a more uniform current density in the foil adjacent the end terminal. These terminals are generally connected to the foil by heating the terminal and foil to a relatively high temperature and applying silver solder or the like to join them, and this requires considerable labor time and cost.

It is therefore an object of the present invention to provide a novel electrical inductive apparatus which overcomes, to a large degree, the aforementioned disadvantages.

Another object of the present invention is to provide an electrical inductive apparatus having a pair of windings connectable for effective operation in either series or parallel relationship and which can be provided with protective circuit interrupting means having a condition responsive element which is required to carry only a portion of the total current of a winding, and wherein the inductive apparatus requires relatively fewer winding coils and coil end terminals.

Another object of the present invention is to provide a transformer requiring a minimum number of winding coils connectable to provide a pair of windings of substantially equal impedance and wherein each winding can be provided with protective circuit interrupting means having an element thereof which carries only a portion of the total current carried by the winding associated therewith.

Another object is to provide a transformer having a pair of windings disposed concentrically with another winding and respectively on radially opposed sides thereof wherein the windings of the pair have impedance sufficiently close in value to provide effective parallel operation thereof and wherein each can be provided with protective circuit interrupting means having a condition responsive element connected to carry only a portion of the total current of the winding associated therewith.

Another object is to provide a transformer having a primary winding and four secondary winding coils, two disposed on each of the radially opposed sides of the primary winding wherein the four coils can be connected to provide two secondary windings of substantially equal impedance and with each secondary winding including two of the coils connected in parallel with each other whereby the transformer can be provided with protective circuit interrupting means having a condition responsive element for each secondary winding connected so as to carry only a fraction of the total current of the secondary winding associated therewith.

Another object is to provide a transformer including a first winding and four winding coils with two of the coils on each of the radially opposed sides of the first winding and in inductive relationship therewith and wherein all four winding coils have impedances sufficiently close in value to provide efficient operation thereof when connected in parallel with each other.

Another object is to provide a transformer having a primary winding and four secondary winding coils of the sheet-wound type coaxial with the primary winding and with two of the coils on the radially inner side of the primary winding and two on the radially outer side thereof and wherein all four coils have substantially equal impedance values.

These and other objects and advantages of the present invention will become apparent hereinafter.

Briefly, in accordance with the present invention, an apparatus is provided which includes a first winding coil, second and third winding coils on the radially inner side of the first winding coil, and fourth and fifth winding coils on the radially outer side of the first winding coil, the turns of each of the fourth and fifth winding coils having a predeterminately lower resistance per unit length than that of each of the second and third winding coils such that the second, third, fourth and fifth winding coils can be connected for effective parallel operation.

Figure 2:
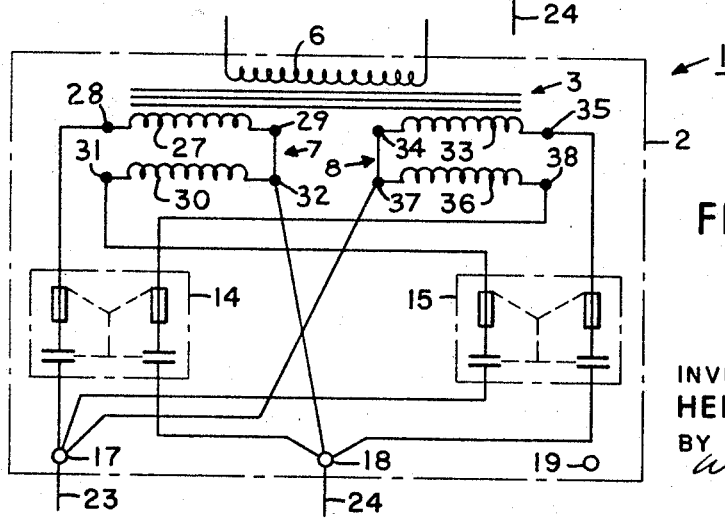
Figure 5:
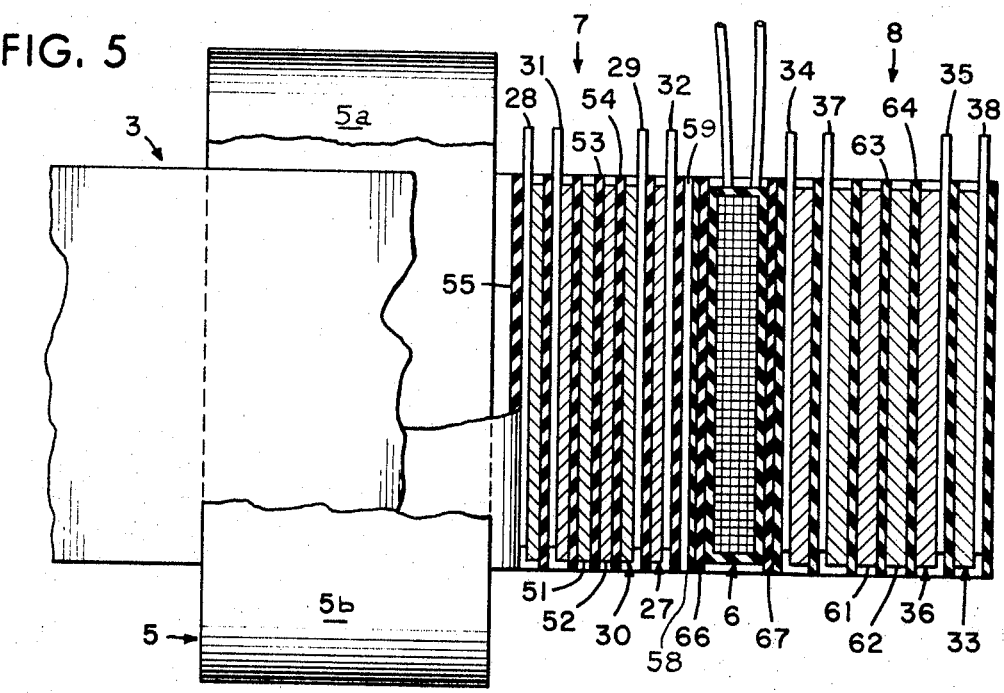
Figure 4:
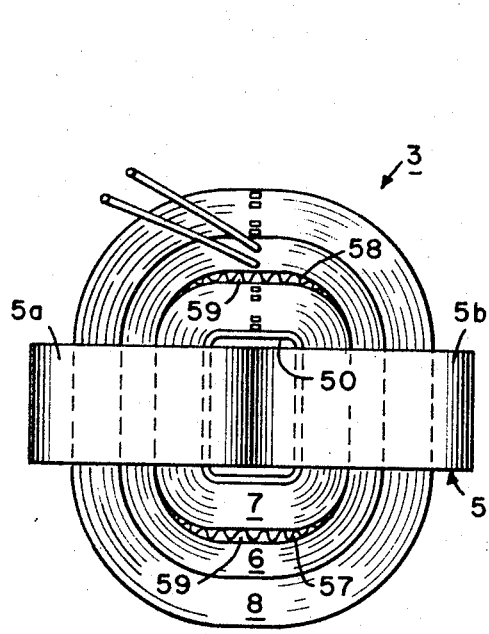
Figure 3:
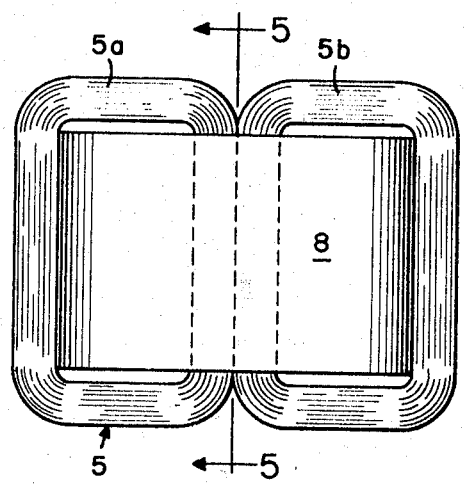
Figure 6:
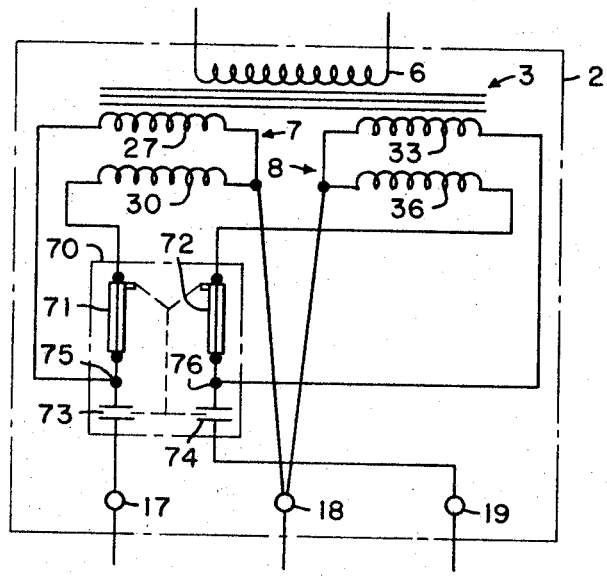
Figure 8:
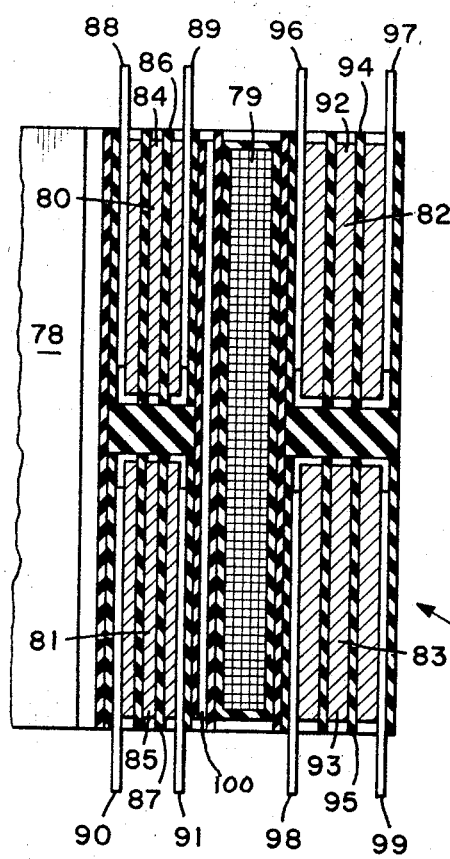
Figure 7:
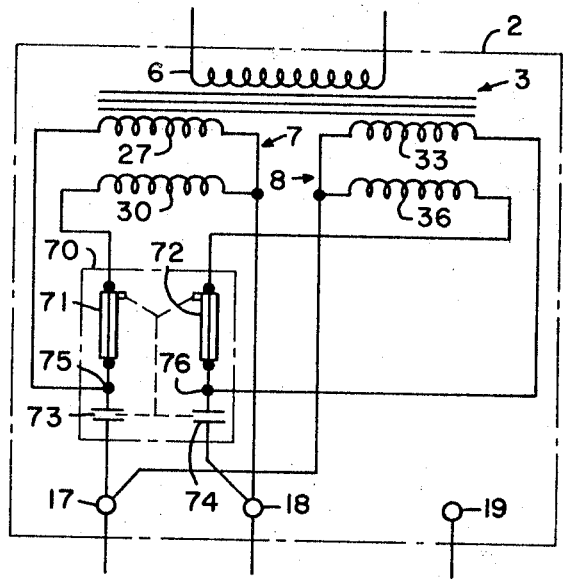

In the drawings which illustrate an embodiment of the invention,

FIG. 1 is a schematic connection diagram showing a transformer according to the present invention with the secondary windings thereof connected to supply power to a three-wire distribution circuit through protective circuit means, FIG. 2 is a schematic connection diagram showing the transformer of FIG. 1 with the secondary windings thereof connected in parallel to supply power to a two-wire distribution circuit through protective circuit means, FIG. 3 is a front elevational view of the core and coil assembly of the transformer of FIG. 1, FIG. 4 is a top plan view of the core and coil assembly of FIG. 3, FIG. 5 is a greatly enlarged partial section taken along the line 5—5 of FIG. 3, FIG. 6 is a schematic diagram showing the transformer of FIG. 1 with the secondary windings connected to a three-wire distribution circuit utilizing a modified protective circuit arrangement, FIG. 7 is a schematic diagram showing the transformer of FIG. 1 with the secondary windings connected in parallel to a two-wire circuit utilizing the modified protective circuit means of FIG. 6, and FIG. 8 is partial sectional view of a modified transformer construction.

Referring now to the drawings and particularly to FIG. 1, a transformer 1, such as a distribution transformer, is shown including a transformer tank or casing 2 enclosing a transformer core and coil assembly 3, and containing a dielectric, for example, an insulating liquid, such as transformer oil (not shown). The core and coil assembly 3 includes a magnetic core 5, a primary winding 6, and a pair of secondary windings 7 and 8. The primary winding 6 is connected through a pair of bushings 10 and 11 to a pair of electrical power supply lines 12 and 13. The secondary windings 7 and 8 are connected to protective circuit interrupting means, shown diagrammatically as two circuit breakers 14 and 15, and to three transformer terminals 17, 18 and 19 which are respectively connected through three secondary transformer bushings 20, 21 and 22 to three distribution circuit or load circuit conductors 23, 24 and 25.

Secondary winding 7 includes a secondary winding coil 27 having coil end terminals 28 and 29, and a secondary winding coil 30 having coil end terminals 31 and 32. Secondary winding 8 includes a secondary winding coil 33 having coil end terminals 34 and 35, and a secondary winding coil 36 having coil end terminals 37 and 38.

The circuit breakers 14 and 15 are identical in construction and operation and like parts of these breakers are identified by like reference numerals but with the letter $a$ added to each of the numerals designating the parts of breaker 15.

The circuit breaker 14 is diagrammatically shown including a two-pole switch 39 having a pair of circuit interrupting switches 40 and 41 mechanically interconnected for simultaneous operation by an insulating connection portion 42, and a pair of condition responsive elements shown as bimetal elements 43 and 44 for effecting actuation of switch 39 through a switch operating mechanism indicated generally at 45. The mechanism 45 includes a latch 46 normally engaged with an abutment 47 on the connection portion 42 of switch 39 to maintain the switches 40 and 41 closed. A spring 48 is connected to switch 39 to urge the switches toward the open circuit positions thereof. Since thermally responsive circuit breakers are well known and commercially available, further details of the mechanical construction features of the breakers 14 and 15 have been omitted therefrom.

End terminal 28 of coil 27 is connected through bimetal element 43 and switch 40 to transformer terminal 17, and end terminal 38 of coil 36 is connected through bimetal element 44 and switch 41 to transformer terminal 19. End terminal 35 of coil 33 is connected through bimetal element 43a and switch 40a to transformer terminal 19, and end terminal 31 of coil 30 is connected through bimetal element 44a and switch 41a to transformer terminal 17. End terminals 29 and 32 of coils 27 and 30 are connected together and to transformer terminal 18, and end terminals 34 and 37 of coils 33 and 36 are connected together and to transformer terminal 18. With these connections, the coils 27 and 30 are connected in parallel relation between the transformer terminals 17 and 18 to impress the voltage of winding 7 across a load connected between circuit conductors 23 and 24. The coils 33 and 36 are connected in parallel relation between transformer terminals 18 and 19 to impress the voltage of winding 8 across a load connected between circuit terminals 24 and 25. Also, the windings 7 and 8 are connected in series relation between transformer terminals 17 and 19, and, thus, the sum of the voltages of windings 7 and 8 will be impressed across a load connected between circuit conductors 23 and 25.

The circuit breakers 14 and 15 are disposed in the insulating fluid so that each bimetal element is responsive to current flow in the coil to which it is connected and to the temperature of the insulating fluid. Actuation of either of the bimetal elements of either circuit breaker will effect actuation of both switches of that breaker. With the arrangement shown, each circuit breaker is connected to a secondary coil of winding 7 and a coil of winding 8 so that both windings 7 and 8 will be disconnected from the distribution circuit upon the occurrence of an overload condition. For example, should an overload condition occur as a result of overloading on the circuit 23–24, bimetal element 43 will actuate mechanism 45 to release latch 46 from abutment 47 so that switches 40 and 41 open, thereby disconnecting coil 27 of winding 7 and coil 36 of winding 8 from the load circuit. Since coil 36 of winding 8 is disconnected by actuation of breaker 14, the full load current due to loading of circuit 24–25 will flow through bimetal element 43a, and this will effect actuation of mechanism 45a and open switches 40a and 41a. Thus, upon the occurrence of an overload condition on either secondary winding, both of the secondary windings will be disconnected to interrupt the supply of power to the distribution circuit.

Since each bimetal element carries only the current of one of the coils of a secondary winding instead of the total current thereof, the relative rating and size thereof can be smaller than in arrangements where the total secondary winding current must flow therethrough. Also, the current interrupting capacity of each of the switches 40, 40a, 41 and 41a can be much lower or half that required in arrangements where the full secondary winding current must be interrupted by a single switch.

It will be apparent that the impedances of the two coils of each secondary winding must be close enough in value so that there is an adequate or practical division of the total secondary winding current between the two coils or so that one coil does not carry a much greater portion of the total current of that secondary winding than the other. Furthermore, in order to be able to reconnect the secondary windings 7 and 8 in parallel relationship for supplying power to a load circuit at the voltage of one secondary winding but at double the current rating of one secondary winding alone, such as shown in the circuit arrangement of FIG. 2, the impedances of secondary windings 7 and 8 must be relatively close in value in order to obtain an adequate or practical division of current between the two secondary windings. Thus, in order to supply power to a load connected between circuit conductors 23 and 24 in FIG. 2, the impedances of all of the secondary coils 27, 30, 33 and 36 must not differ too greatly from each other since they are all connected in parallel relationship. It would be ideal, of course, if all four secondary coils had the same impedance value.

The core and coil assembly 3, as is described in detail hereinafter, is constructed and arranged such that the secondary winding coils 27, 30, 33 and 36 have substantially equal impedance values.

Referring now particularly to FIGS. 3, 4 and 5, the magnetic core 5 of core and coil assembly 3 includes a pair of core sections 5a and 5b forming a three-legged or shell-type core. Each core section consists of a plurality of flat-wise nested turns or laminations of magnetic strip material. The primary winding 6 and secondary windings 7 and 8 are concentrically disposed on the core 5 and surround the center leg thereof. The coils 27 and 30 of winding 7 are sheet-wound or foil-wound coils surrounding the center leg of core 5 on the radially inner side of primary winding 6. The coils 33 and 36 of winding 8 are foil-wound coils which surround the center leg of core 5 on the radially outer side of primary winding 6. The primary and secondary winding coils are pre-formed and may be assembled with the core 5 by lacing successive portions of the magnetic strip material of the core sections 5a and 5b through the window, indicated at 50 of winding 7 until both core sections are built up around the coils.

The inner secondary coils 27 and 30 consist of a plurality of spiral-wound or concentric turns of metal sheets or foils 52 and 51, respectively, such as copper or aluminum foils, of predetermined cross-sectional areas with layers or sheets 53 and 54 of suitable insulating material, such as conventional transformer paper, disposed therebetween and serving as turn insulation. Coils 27 and 30 are formed by simultaneously winding the foils 51 and 52 with the insulating sheets 53 and 54 onto an insulating coil form 55.

Coil spacers 57 and 58 of insulating material, such as sheets of corrugated paper, are disposed between the primary winding 6 and the radially inner secondary winding 7 and provide axially extending fluid flow passages or ducts 59 for cooling purposes. The insulating liquid in the casing 2 can thus circulate through ducts 59 during operation of the transformer to aid in the cooling thereof.

The outer secondary coils 33 and 36 consist of a plurality of spiral-wound or concentric turns of metal sheets or foils 62 and 61, respectively, such as copper or aluminum foils, of predetermined cross-sectional areas with layers or sheets 63 and 64 of suitable insulating material, such as paper, serving as turn insulation. The coils 33 and 36 are formed by simultaneously winding the metal foils 61 and 62 with insulating sheets 63 and 64.

Additional layers 66 and 67 of insulating material, such as paper, may be used as coil insulation between the primary winding 6 and each of the secondary windings 7 and 8.

Each of the secondary winding coils has the same number of turns, and it will be assumed herein that the foil sheets 51, 52, 61 and 62 are formed from the same kind of metal, for example, copper; however, it will be apparent that foil sheets of different kinds of metals may be used in the same transformer, if desired.

Each of the end terminals 28, 29, 31, 32, 34, 35, 37 and 38, as seen in FIGS. 3 and 4, is in the form of an elongated metal bar, such as a copper bar, which extends substantially from the bottom side of the metal foil to which it is connected upwardly beyond the upper side thereof for connection with a transformer lead.

The impedance values of secondary windings in any given transformer depend, of course, upon the leakage reactance and resistance values of the windings. The length of the mean turn of a secondary winding affects the leakage reactance between the primary winding and the secondary winding, and also the resistance of the secondary winding. The leakage reactance is also affected by such factors as the amount of insulation between windings and the spacing of the windings. Since the length of the mean turn in a secondary winding on the radially outer side of the primary winding is much greater than that of a secondary winding on the radially inner side of the primary winding, the radially outer winding would normally have a much greater resistance, for example 50% greater, than that of the inner secondary winding where the resistance per unit length of turn of each is the same. Also, with normal insulation and the usual cooling ducts, the leakage reactance between the primary and radially outer secondary windings is usually greater than the reactance between the primary and radially inner secondary windings because of the difference in the lengths of the mean turns of the two secondary windings.

The secondary windings 7 and 8 of transformer 10 are formed to provide a predetermined ratio between the resistance values thereof which results in the secondary windings having substantially equal impedances or impedance values which are sufficiently close in value to permit conection of the secondary windings for parallel operation. This is accomplished by forming the secondary winding coils 27, 30, 33 and 36 of transformer 10 such that each of the radially outer coils 33 and 36 has a resistance per unit length of turn predeterminately less than that of the inner coils 27 and 30 such that the secondary coils have substantially equal impedance values or are close enough in value for parallel operation. As seen in FIG. 5, the metal foils 61 and 62 of the outer coils 33, 36 have equal cross-sectional areas and the foils 51 and 52 of coils 27 and 30 have equal cross-sectional areas, but the cross-sectional area of metal foils 61 and 62 is substantially greater than that of foils 51 and 52; thus, the resistance per unit length of turn of each of the outer coils 33 and 36 is less than that of the inner coils 27 and 30. The resistance value of the outer coils 33 and 36, as determined by the resistance per unit length of foils 61 and 62, and the resistance value of the inner coils 27 and 30, as determined by the resistance per unit length of foils 51 and 52, are related so that the impedances of the inner and outer coils are all substantially equal or are sufficiently close in value so as to obtain a practical division of current between the secondary coils when all of them are connected in parallel relation. The particular ratio of the resistances of the inner and outer secondary windings necessary to effect substantially equal impedances or impedances sufficiently close in value for a given transformer will depend upon the type of coil construction, coil spacing, insulation size and location of cooling ducts, and kva. rating of the transformer.

If all of the secondary coils 27, 30, 33 and 36 are made so that the resistances thereof are the same and the reactance values thereof are also the same, then the impedances of all four secondary coils will, of course, be equal and the load current will divide equally between the four secondary coils during operation of the transformer when connected as shown in FIG. 2. However, since each of the outer secondary coils 33 and 36 has a greater mean diameter or mean turn length than each of the inner secondary coils 27 and 30, the reactances of the outer coils 33 and 36 will usually be somewhat higher than the reactances of the inner coils 27 and 30. Where the reactances of the outer coils are greater than the inner coils, which will usually be the case, the size of the foils 51, 52, 61 and 62 may be chosen so that the resistance values of the inner coils 27 and 30 are greater than the resistance values of the outer coils 33 and 36 by an amount that will substantially compensate for the difference in the reactances between the inner and outer coils.

For purposes of illustration, one distribution transformer made in accordance with the present invention had a 100 kva. rating with a voltage rating of 7200 primary volts to 120/240 secondary volts. Each of the secondary coils had 11 turns, and each was formed of a copper sheet having a width dimension of 9 inches. The foil of each of the inner coils was .013 of an inch in thickness, and the foil of each of the outer coils was .021 of an inch in thickness. The sheets of the inner coils were wound simultaneously with two sheets of turn insulation, each .003 of an inch in thickness. The sheets of the outer coils were also wound simultaneously with two sheets of turn insulation that were .003 of an inch in thickness. The coil insulation or low voltage to high voltage insulation was .184 of an inch in thickness. Also, two corrugated spacers, each about 7 inches wide, were disposed adjacent the opposed outer sides of the inner two coils to provide about a ⅜-inch gap between the primary winding and the inner two coils and which provided axially extending cooling ducts. The length of the effective mean turn of the simultaneously wound inner secondary coils was about 28.9 inches and that of the two simultaneously wound outer secondary coils was about 45 inches.

With the above-described example transformer construction, the resistance of the inner secondary winding was about 48.5% of the sum of the resistances of the two secondary windings in series while the resistance of the outer secondary winding was about 51.5% of the aforementioned sum. Thus, the resistances of the inner and outer secondary windings were close in value, the outer secondary winding being slightly higher than the inner secondary winding. With the secondary windings connected for parallel operation, a good division of current between the secondary windings was obtained. The outer secondary winding carried about 48% of the total current and the inner secondary winding about 52% of the total current, thus indicating that the impedances of the two secondary windings were substantially equal.

Since the foils used in the radially inner secondary coils of the above example transformer were .013 of an inch in thickness and the foils of the outer secondary coils were .021 of an inch in thickness, the cross-sectional area of each outer coil foil was about 62% greater than the inner coil foil so that each of the inner coils had about a 62% greater resistance per unit length of turn than the outer coils. In this case, the inner secondary winding carried only about 4% of the total current more than the outer secondary winding to provide a practical division of current for effective parallel operation. Depending on the expected loading conditions, the secondary windings may be constructed for a particular transformer such that one secondary winding carries a still greater proportion of the total current than the other and yet the division of current may be adequate for effective operation of the windings. For example, in some cases the foils for the inner secondary coils may have a greater resistance per unit length than that of the outer coils by only such an amount that one of the secondary windings carries as high as 20% of the total current more than the other and yet this may be a practical division of current for the particular application or load. Generally, the resistance per unit length of turn in each of the inner secondary coils should be at least 20% greater than that of the outer coils to produce a transformer that will provide a practical division of current between parallel connected secondary windings.

In the transformer circuit arrangements illustrated in FIGS. 1 and 2, only a portion or half of the total winding current flows in each of the bimetal elemetns 43, 43a, 44 and 44a and switches 40, 40a, 41 and 41a of breakers 14 and 15. Thus, the rating of each bimetal element and the current interrupting capacity of each switch need only correspond to the rating of one secondary winding coil.

FIG. 6 illustrates a modified transformer circuit arrangement for supplying power to a three-wire distribution circuit which utilizes a single circuit breaker 70 having a pair of bimetal elements 71 and 72 adapted to operate a pair of switches 73 and 74. Coil 30 of winding 7 is connected in a series circuit including bimetal element 71 and the switch 73 between the transformer terminals 17 and 18. The coil 27 of winding 7 is connected between transformer terminal 18 and a circuit point 75 between the bimetal element 71 and switch 73. Coil 36 of winding 8 is connected in a series circuit with bimetal element 72 and switch 74 between transformer terminals 18 and 19, and coil 33 of winding 8 is connected between terminal 18 and a circuit point 76 located between bimetal element 72 and switch 74.

FIG. 7 illustrates another modified transformer circuit arrangement using circuit breaker 70 but with the secondary windings 7 and 8 connected in parallel between transformer terminals 17 and 18 for supplying power to a two-wire distribution circuit at the voltage of one secondary winding but at double the current rating of one secondary winding alone.

In the circuit arrangements shown in FIGS. 6 and 7, the current of only one coil flows through each of the bimetal elements 71 and 72 but the current of the two coils flows through each of the switches 73 and 74. Although each of the switches 73 and 74 must be designed to interrupt the total current of the secondary winding to which it is connected, each of the bimetal elements need only be designed in accordance with the rating of one secondary coil.

In FIG. 8 there is shown a modified core and coil assembly 77 which includes a core 78, a primary winding 79 surrounding core 78, a pair of foil-wound axially spaced secondary winding coils 80 and 81 on the radially inner side of primary winding 79, and a pair of foil-wound axially spaced secondary coils 82 and 83 disposed on the radially outer side of primary winding 79.

The inner secondary coils 80 and 81 are formed of metal sheets 84 and 85, respectively, of predetermined cross-sectional area to provide a predetermined resistance per unit length of turn. Turn insulation for coils 80 and 81 is indicated at 86 and 87. Coil 80 is provided with end terminals 88 and 89, and coil 81 is provided with end terminals 90 and 91.

The outer secondary coils 82 and 83 are formed of metal sheets 92 and 93, respectively, of predetermined cross-sectional area and which is greater than that of sheets 84 and 85 to provide a predetermined resistance per unit length of turn which is substantially less than that of coils 80 and 81. Turn insulation for coils 82 and 83 is indicated at 94 and 95. Coil 82 is provided with end terminals 96 and 97, and coil 83 is provided with end terminals 98 and 99.

The sheets 84, 85, 92 and 93 are chosen such that the impedances of the four secondary coils 81, 82, 83, and 84 are substantially equal or are close enough in value so that the secondary coils can be connected in transformer circuits similar to those illustrated in FIGS. 1, 2, 6 and 7. In other words, with the impedances of all four secondary coils 80, 81, 82 and 83 substantially the same or close enough in value, any two of these secondary coils can be connected in parallel to provide one secondary winding and the other two secondary coils connected in parallel to provide another secondary winding to thereby provide three-wire service. Since the impedances of such secondary windings are close in value, they can be connected in parallel with each other to supply power to a two-wire load circuit at the voltage of one secondary winding alone but at double the current rating of one secondary winding alone. Also, circuit interrupting means can be connected with these windings such that the condition responsive element and associated switch, or just the condition responsive element, carries the current of only one of the secondary coils.

Cooling ducts 100 are disposed between the inner secondary coils 80 and 81 and primary winding 79 to aid in the cooling of the core and coil assembly 77 during operation.

The impedances of the two inner secondary coils in either one of the assemblies shown in FIGS. 5 and 8 are, of course, substantially equal since these secondary coils have the same resistance per unit length of turn and the length of the mean turn of each is substantially the same. Likewise, the impedances of the two outer secondary coils in either one of the assemblies of FIGS. 5 and 8 are substantially equal since these secondary coils have the same resistance per unit length of turn and the length of the mean turn of each is substantially the same.

By increasing the reactance between the primary coil and inner secondary coils, such as by increasing the effective gap therebetween, for example, by increasing the size of the cooling ducts, in either one of the assemblies 3 and 77, it is possible to reduce the difference between the resistance per unit length of turn values of the inner and outer secondary coils required to obtained substantially equal impedance values.

Instead of using separate layers of insulation between the turns of a coil, the turns may be provided with other suitable insulating materials; for example, the metal foil sheet may be coated with a suitable insulating resin or varnish. Also, in some cases it may be desired to wind more than one metal foil sheet in forming each coil so that each effective turn will include plural layers of metal foil. In such a case, the plural sheets may be in electrical contact with each other throughout their lengths and/or have their inner ends electrically connected together and their outer ends connected together to form a coil with multiple layer turns.

In the manufacture of polyphase transformers, such as three-phase transformers, three transformers, each having core and coil assemblies constructed like either of the assemblies 3 or 77, may be interconnected to provide a three-phase transformer arrangement. Also, if it is desired to manufacture a three-phase transformer, for example, one utilizing a single three-phase magnetic core instead of three single-phase cores, each winding leg of the three-phase core can be provided with a set of windings constructed and related like the windings of assemblies 3 or 77. In this way, the secondary winding coils of each phase may be connected for series or parallel operation since they will have substantially equal impedance values or impedances close enough in value for effective parallel operation.

From the foregoing, it is now apparent that a novel electrical induction apparatus meeting the objects set out hereinbefore is provided. It is to be understood that changes or modifications to the form of the invention set forth in the disclosure by way of illustration may be made by those skilled in the art without departing from the true spirit and scope of the invention as defined by the claims which follow.

The embodiments of the invention in which an exclusive property or privilege is claimed are defined as follows:

1. A distribution transformer comprising a magnetic core having a core leg, a primary winding surrounding said core leg and having connection means for connecting said primary winding to power supply means, first and second secondary windings each including a pair of secondary coils surrounding said core leg in inductive relation with said primary winding and adapted for connection in parallel with each other, two of said coils being disposed on the radially inner side of said primary winding and the other two of said coils being disposed on the radially outer side of said primary winding, each of said coils having a substantially equal number of conductive turns so that substantially equal voltages are induced therein when said primary winding is connected to said supply means, and connection means for selectively connecting said secondary windings in series circuit relation with each other to provide a voltage across said secondary windings substantially equal to twice the voltage induced in one of said secondary windings and in parallel circuit relation with each other to provide a voltage across said secondary windings substantially equal to the voltage induced in one of said secondary windings, said first named two coils each having a resistance per unit length of turn greater than that of each of said other two coils to provide a reduced differential between the impedance value of each one of said first named coils and the impedance value of each one of said other two coils.

2. The distribution transformer according to claim 1, wherein said first named two coils each has a resistance per unit length of turn value about 60% greater than that of each of said other two coils.

3. The distribution transformer according to claim 1, wherein at least some of said coils each includes turns of a metal foil having a width substantially equal to the height of the coil.

4. The distribution transformer according to claim 1, wherein each of said coils includes turns of a metal foil having a width substantially equal to the height of the coil.

5. The distribution transformer according to claim 1, including condition responsive circuit interrupting means including first and second switch means respectively connected to said secondary windings for respectively interrupting current flow therein when actuated, first condition responsive means connected in series with one of said coils of said first secondary winding for actuating said first switch means in response to a predetermined condition, and second condition responsive means connected in series with one of said coils of said second secondary winding for actuating said second switch means in response to the occurrence of a predetermined condition.

6. The distribution transformer according to claim 1, including circuit interrupting means connected with each of said secondary windings for interrupting the flow of current therein upon the occurrence of predetermined conditions, first condition responsive means connected in series with only one of said coils of said first secondary winding for actuating said circuit interrupting means in response to said predetermined conditions, and second condition responsive means connected in series with only one of said coils of said second secondary winding for actuating said circuit interrupting means in response to said predetermined conditions.

7. The distribution transformer according to claim 1, wherein said other two coils respectively include metal foils having a width equal to the height of said two coils, said foils being wound simultaneously one within the other.

8. The distribution transformer according to claim 7, wherein said first named two coils each includes a metal foil having a width equal to the height of the coil, said last named foils being wound simultaneously one within the other.

9. The distribution transformer according to claim 8, wherein said first named two coils each has a resistance per unit length of turn value at least 20% greater than that of each of said other two coils.

10. The distribution transformer according to claim 1, wherein said first named two coils each has a resistance per unit length of turn value at least 20% greater than that of each of said other two coils.

11. The distribution transformer according to claim 10, including circuit interrupting means connected with each of said secondary windings for interrupting the flow of current therein, and means for actuating said circuit interrupting means including four current responsive elements respectively connected in series with said coils for effecting actuation of said circuit interruping means in response to an abnormal current condition in any of said coils.

12. The distribution transformer according to claim 10, wherein the turns of each of said other two coils have a cross-sectional area greater than that of the turns of each of said first named two coils.

13. The distribution transformer according to claim 10, wherein the resistance per unit length of turn value of each of said first named coils is the same, and the resistance per unit length of turn value of each of said other coils is the same.

14. The distribution transformer according to claim 13, wherin each of said coils includes turns of a metal foil having a width equal to the height of the respective coil.

15. The distribution transformer according to claim 13, including at least three transformer bushing terminals, said connection means including leads connecting one end of each of said coils to one of said terminals, the other ends of the coils of one of said pairs being connected to a second of said terminals, and the other ends of the coils of the other of said pairs being connected to the third of said terminals when said secondary windings are connected in said series circuit relation.

16. The distribution transformer according to claim 15, including a casing enclosing said core and windings, a pair of circuit breakers in said casing each including a pair of switch means and a pair of associated current responsive elements for actuating the pair of switch means associated therewith upon predetermined conditions, one of said current responsive elements and one of said switches being connected in series between each of said other ends and the terminal connected thereto.

References Cited

UNITED STATES PATENTS

| | | | |
|---|---|---|---|
| 2,340,057 | 1/1944 | Hodneffe | 317—14 |
| 2,476,139 | 7/1949 | Forbes | 317—14 |
| 2,476,147 | 7/1949 | Hodneffe | 317—14 |
| 2,597,185 | 5/1952 | Roeding et al. | 317—14 |
| 2,817,794 | 12/1957 | Amundson | 317—14 |
| 2,930,964 | 3/1960 | Goodman | 336—170 |
| 3,210,706 | 10/1965 | Book | 336—170 |
| 2,735,979 | 2/1956 | Cohen | 336—223 XR |
| 2,962,600 | 11/1960 | Preininger | 336—170 XR |
| 3,200,357 | 8/1965 | Olsen et al. | 336—170 XR |
| 3,360,754 | 12/1967 | Gerdiman | 336—223 XR |

LEWIS H. MYERS, *Primary Examiner.*

T. J. KOZMA, *Assistant Examiner.*

U.S. Cl. X.R.

336—147, 183, 223